United States Patent
Miyazaki et al.

(10) Patent No.: US 7,515,443 B2
(45) Date of Patent: Apr. 7, 2009

(54) INVERTER CIRCUIT

(75) Inventors: Hiroyuki Miyazaki, Chuo-ku (JP); Takeshi Hatakeyama, Chuo-ku (JP)

(73) Assignee: Sumida Electric Co., Ltd., Tokyo (JP)

( * ) Notice: Subject to any disclaimer, the term of this patent is extended or adjusted under 35 U.S.C. 154(b) by 108 days.

(21) Appl. No.: 11/761,474

(22) Filed: Jun. 12, 2007

(65) Prior Publication Data

US 2008/0025055 A1    Jan. 31, 2008

(30) Foreign Application Priority Data

Jul. 27, 2006   (JP)  .............................. 2006-205260

(51) Int. Cl.
H02M 7/42    (2006.01)
H02H 3/20    (2006.01)
H05B 41/16   (2006.01)

(52) U.S. Cl. ........................... 363/95; 361/86; 315/256; 315/282; 363/55; 363/131

(58) Field of Classification Search ................. 363/55, 363/56.02, 56.03, 56.05, 95, 9, 98, 131; 315/212, 315/220, 255, 256, 257, 277, 282; 361/86, 361/91.1

See application file for complete search history.

(56) References Cited

U.S. PATENT DOCUMENTS 7,271,549 B2 *  9/2007  Wey et al. ................. 315/282

7,315,136 B1 *  1/2008  Chen et al. ................. 315/282
2005/0225261 A1 * 10/2005  Jin ............................. 315/255
2006/0158124 A1   7/2006  Hosaka et al.

FOREIGN PATENT DOCUMENTS

| JP | 2005-310587 | | 11/2005 |
|---|---|---|---|
| JP | 2005353548 | A | 12/2005 |
| JP | 2006066220 | A | 3/2006 |
| JP | 2006179419 | A | 7/2006 |
| KR | 1020060052421 | A1 | 5/2006 |

* cited by examiner

Primary Examiner—Gary L Laxton
(74) Attorney, Agent, or Firm—Coats & Bennett, P.L.L.C.

(57) ABSTRACT

An inverter circuit is configured with a reduced number of components for driving a plurality of discharge tubes. Primary coils of a plurality of drive transformers are respectively connected in series to primary coils of corresponding balancer-transformers, and then connected between output terminals of a switching circuit in parallel. The secondary coils of the balancer-transformers are connected in series, and connected between the output terminals of the switching circuit to configure an inverter circuit for driving a plurality of discharge tubes. The inverter circuit includes a voltage detecting circuit for detecting a voltage at any of connecting-midpoint of the series-connected secondary coils of the balancer-transformers, and a voltage comparing circuit for comparing an output of the voltage detecting circuit with a reference voltage. A signal designates an abnormal operation at an output of the voltage comparing circuit when the voltage of the connecting-midpoint exceeds the reference voltage.

9 Claims, 2 Drawing Sheets

INVERTER CIRCUIT

This application claims the benefit of Japanese Patent Application No. 2006-205260, filed on Jul. 27, 2006, which is hereby incorporated by reference herein in its entirety.

BACKGROUND OF THE INVENTION

1. Field of the Invention

The present invention relates to inverter circuits that control emission of discharge tubes such as fluorescent lights, and particularly to inverter circuits that are able to realize controls in case of abnormal operations such as an open-circuited load abnormality, a short-circuited load abnormality, and the like with a reduced number of circuit components.

2. Description of the Related Art

As well-known, a discharge tube such as a fluorescent light emits light by driven with high frequency drive signals generated by an inverter circuit. This type of discharge tube is not only used for lighting purpose, but recently also frequently used for a light source of a backlight employed in a liquid crystal display apparatus. An inverter circuit and discharge tubes are configured such that a drive transformer is provided at an output side of an inverter included in the inverter circuit, and a fluorescent light is connected to a secondary coil terminal of the drive transformer by way of connectors.

However, it happens sometimes that the fluorescent light is not connected to the secondary coil terminal due to some defects in the connection terminals. Or, if output terminals of the secondary coils of the drive transformer are short-circuited with some reason, discharges may occur at the drive transformer by the high voltages, this may causes problems of smoking, firing, and the like. Other than the above-mentioned reason, if the fluorescent light breaks, or expires its life, output terminals of the secondary coils of the drive transformer connected to the fluorescent light become an open-circuited or a shot-circuited condition, so that this also cause above-mentioned problems of smoking, firing, and the like.

Accordingly, in the inverter circuit, it is necessary to avoid any heating up state in case of the abnormal operations such as the open-circuited load condition, short-circuited load condition. For the sake, conventionally, it is common to provide an abnormality operation detecting circuit that detects an open condition or short-circuited condition of the output terminals of the secondary coils in the inverter, and stops the operation of the inverter in case of the abnormal operation.

It is possible to detect current flowing through a discharge tube by connecting a detecting resistor at a low voltage side of the fluorescent light and by detecting the voltage across the resistor. Accordingly, the current flowing through the discharge tube is controlled to be constant by forming a feedback loop for the voltage across the resistor. Further, there are provided with an over-voltage protection circuit and an over-current protection circuit in the inverter circuit, which operate in case of abnormality in the discharge tubes.

For example, Japanese Patent Laid-open No. 2005-310587 discloses a circuit in which dividing capacitors are provided at secondary coils of a voltage-current conversion transformer, and an abnormal voltage detecting circuit for detecting abnormality of the discharge tubes is connected to the dividing capacitors. When a discharge tube is smashed, or broken, or when it becomes the open-circuited load condition due to non-contact of connectors, an output voltage increases, so that the abnormal voltage detecting circuit is able to detect the abnormality. On the contrary, when the connectors are short-circuited condition due to commingling of foreign particles into the connectors, the output voltage decreases, so that the abnormal voltage detecting circuit is also able to detect the abnormality.

However, it is necessary to provide the same number of abnormality detecting circuits as the number of the discharge tubes in the afore-mentioned conventional inverter circuit. Thereby, in case of inverter circuits for driving discharge tubes used in a larger LCD TV, the number of discharge tubes increases, so that the cost for the abnormality detecting circuits also resultantly increase. The conventional abnormality detecting circuit detects an increase of the detecting voltage when the discharge tube becomes an open-circuited condition, and detects the decrease of the detecting voltage when the discharge tube becomes a short-circuited condition. Accordingly, it is necessary to employ a circuit called a window comparator system. This window comparator circuit detects whether the detected voltage is between the upper limit and the lower limit or not. For the sake, this window comparator circuit requires two comparators. This also increases resultantly the number of components and costs.

SUMMARY OF THE INVENTION

Accordingly, this invention provides an inverter circuit for driving a plurality of discharge tubes, which is equipped with a protection circuit configured with a reduced number of components.

An inverter circuit according to an embodiment of the present invention is an inverter circuit having plural sets of a drive transformer and a balancer-transformer, wherein a primary coil of the drive transformer and a primary coil of the balancer-transformer are connected in series, both ends of each of the series-connections of the plural sets are connected in parallel between output terminals of a switching circuit, and secondary coils of all the balancer-transformers of the plural sets are connected in series and connected between the output terminals of the switching circuit, the inverter circuit comprises:

voltage detecting means for detecting a voltage at any of a connecting-midpoint of the series-connected secondary coils of the balancer-transformers; and voltage comparing means for comparing the voltage at any of the connecting-midpoint of the series-connected secondary coils of the balancer-transformers with a reference voltage, wherein the voltage comparing means outputs a signal indicating an abnormal operation when the voltage at the any of the connecting-midpoint exceeds the reference voltage.

An inverter circuit according to another embodiment of the present invention is an inverter circuit which comprises:

a switching circuit;

n (n is 1, 2, 3 , , ,) series-connecting circuits in each of which a primary coil of a drive transformer and a primary coil of a balancer-transformer are connected in series; and a secondary coil series connecting circuit in which secondary coils of n balancer-transformers used in the n series connecting circuits are connected in series, wherein the n series-connecting circuits and the secondary coil series connecting circuit are connected in parallel between output terminals of the switching circuit.

According the present invention, it is possible to provide an inverter circuit for a plurality of discharge tubes, which is equipped with a protection circuit configured with a reduced number of components.

Further features of the present invention will become apparent from the following description of exemplary embodiments with reference to the attached drawings.

DESCRIPTION OF THE EMBODIMENTS

First Embodiment

Figure 1:
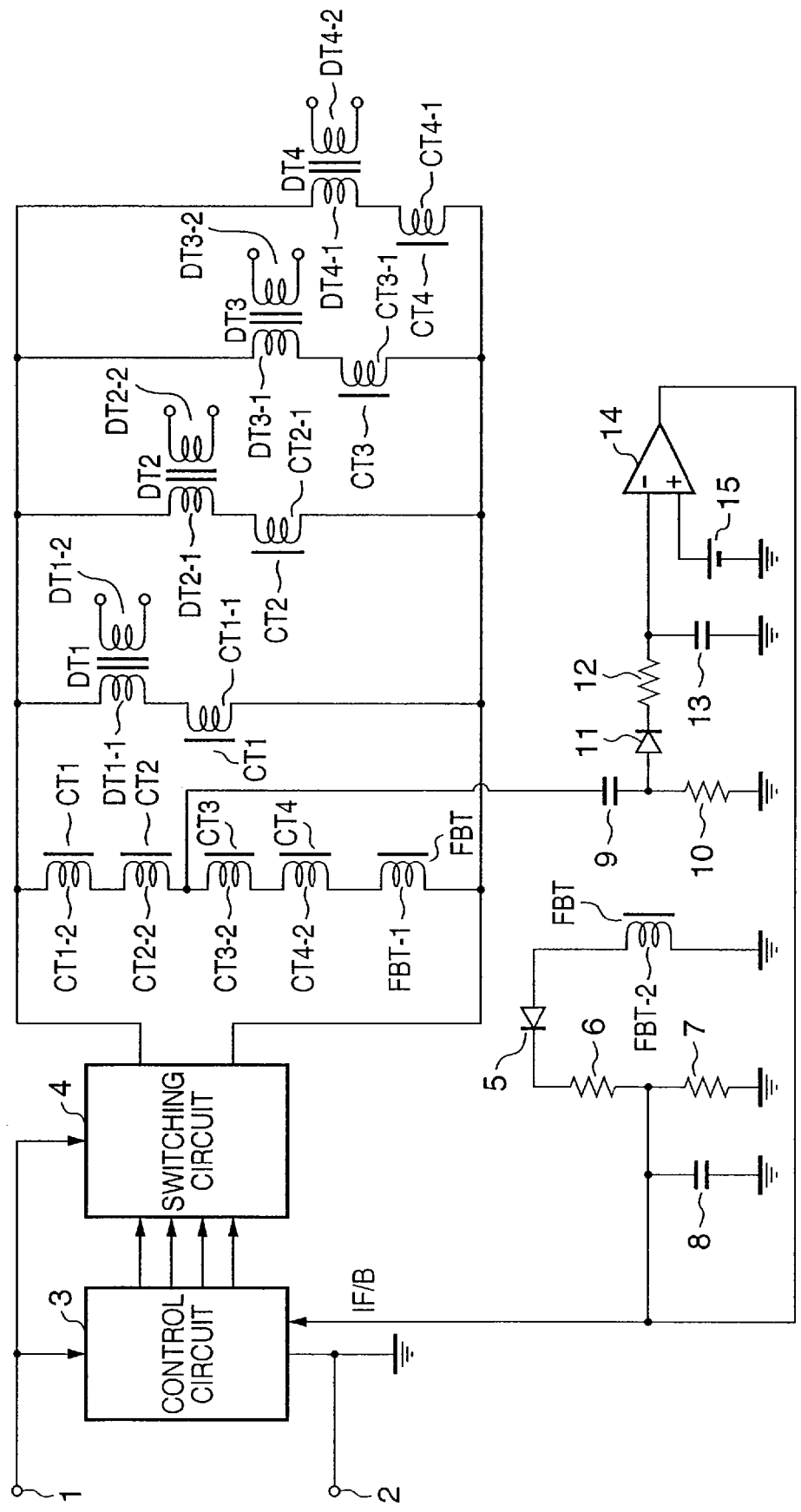
FIG. 1 is a circuit diagram of an inverter circuit employing an even number of drive transformers according to a first embodiment of the present invention.

FIG. 1 shows a circuit diagram of an inverter circuit configured with an even number of drive transformers according to a first embodiment of the present invention. In the inverter circuit in FIG. 1, a DC power source voltage Vin is supplied between terminals 1 and 2. This DC power source voltage Vin is supplied to a control circuit 3 and a switching circuit 4 as DC operating voltages.

The control circuit 3 includes an oscillation circuit inside, and supplies switching pulses to the switching circuit 4. Then, the switching circuit 4 carries out switching of the DC power source voltage Vin to generate high frequency drive signals. On this account, the switching circuit 4 is configured with a plurality of switching devices such as bi-polar or FET transistors.

Further, the inverter circuit in FIG. 1 is configured with four drive transformers DT1 to DT4, four balancer-transformers CT1 to CT4, and one feedback transformer FBT. AS shown in FIG. 1, secondary coils CT1-2 to CT4-2 of the four balancer-transformers CT1 to CT4 and a primary coil FBT-1 of the feedback transformer FBT are connected in series. Both ends of the series-connection circuit are connected to a pair of output terminals of the switching circuit 4, and the high frequency drive signals are applied thereto from the switching circuit 4.

Further, a primary coil DT1-1 of the drive transformer DT1 and a primary coil CT1-1 of the balancer-transformer CT1 are connected in series, and both end of the series-connection circuit are connected to the pair of the output terminals of the switching circuit 4.

In addition, a primary coil DT2-1 of the drive transformer DT2 and a primary coil CT2-1 of the balancer-transformer CT2 are connected in series, and both ends of the series-connection circuit are connected to the pair of the output terminals of the switching circuit 4.

In addition, a primary coil DT3-1 of the drive transformer DT3 and a primary coil CT3-1 of a balancer-transformer CT3 are connected in series, and both ends of the series-connection circuit are connected to the pair of the output terminals of the switching circuit 4.

In addition, a primary coil DT4-1 of the drive transformer DT4 and a primary coil CT4-1 of the balancer-transformer CT4 are connected in series, and both ends of the series-connection circuit are connected to the pair of the output terminals of the switching circuit 4.

Further, as well-known, the high frequency drive signals are generated at the secondary coils DT1-2 to DT4-2 of the drive transformers DT1 to DT4, and drive connected discharge tubes, respectively. However, these connections are well-known, so that they are neglected in the figure.

In addition, an anode of a diode 5 is connected to one of terminals of a secondary coil FBT-2 in the feedback transformer FBT, and a cathode of the diode 5 is connected to ground by way of series-connected two resistors 6 and 7. A capacitor 8 for a rectifier operation is connected between a connecting-midpoint of the two resistors 6 and 7 and the ground. Further, another terminal of the secondary coil FBT-2 is connected to ground.

By the configuration as above described, at the connecting-midpoint of the two resistors 6 and 7, a voltage that is proportional to current flowing through the series-connection circuit of the secondary coils CT1-2 to CT4-2 of the four balancer-transformers CT1 to CT4 and the primary coil FBT-1 of the feedback transformer FBT is obtained. This voltage is supplied to an IF/B terminal of the control circuit 3.

The control circuit 3 controls an oscillation frequency of the oscillator circuit provided inside or width of pulse signals in accordance with the voltage supplied to this IF/B terminal. Thereby, it is controlled so that a current value of the high frequency drive signals flowing through the series-connection circuit of the secondary coils CT1-2 to CT4-2 of the four balancer-transformers CT1 to CT4 and the primary coil FBT-1 of the feedback transformer FBT becomes constant. Thereby, the discharge tubes connected to the secondary coils DT1-2 to DT4-2 of the drive transformers DT1 to DT 4 emit lights with a constant brightness.

In this case, a feedback circuit using this feedback transformer FBT may directly detect current flowing through any one of a plurality of discharge tubes connected to the secondary coils DT1-2 to DT4-2 of the drive transformers DT1 to DT4. On this occasion, the feedback transformer FBT is not necessary.

Further, a connecting midpoint between a secondary coil CT2-2 of the balancer-transformer CT2 and a secondary coil CT3-2 of the balancer-transformer CT3 is connected to ground by way of a series-connection circuit of a capacitor 9 and a resistor 10. The series-connection circuit of a connecting-midpoint between the capacitor 9 and the resistor 10 is also connected to an anode of a diode 11. A cathode of the diode 11 is connected to ground by way of a resistor 12 and a capacitor 13, and a connecting-midpoint between the resistor 12 and the capacitor 13 is connected to an − input terminal of a comparator circuit 14. A + input terminal of the comparator circuit 14 is supplied with a reference voltage (Vref) 15.

An output of the comparator circuit 14 is mixed with the voltage obtained at the connecting-midpoint between two resistors 6 and 7, and supplied to the IF/B terminal of the control circuit 3. In the inverter circuit shown in FIG. 1, when normally operated, the connecting-midpoint between the secondary coil CT2-2 of the balancer-transformer CT2 and the secondary coil CT3-2 of the balancer-transformer CT3 becomes approximately 0 potential.

However, any one of the discharge tubes breaks, expires its life, or becomes improper connection, the connecting-midpoint between the secondary coil CT2-2 of the balancer-transformer CT2 and the secondary coil CT3-2 of the balancer-transformer CT3 widely vary from the 0 potential. This change is detected by the comparator circuit 14, and is supplied to the IF/B terminal of the control circuit 3.

When the inverter circuit normally operates, the comparator circuit 14 may show high impedance by using an open-collector type circuit. By the way, in the above description, it is described that when normally operated, the connecting-midpoint between the secondary coil CT2-2 of the balancer-transformer CT2 and the secondary coil CT3-2 of the balancer-transformer CT3 becomes approximately 0 potential. However, it is normal that circuit components include some fluctuations, so that some levels of tolerance are provided by using the reference voltage (Vref) 15.

Accordingly, any one of the connected discharge tubes breaks, expires its life, or becomes improper connection, and the voltage supplied to the − input terminal of the comparator circuit 14 increases to above the reference voltage (Vref) 15, then, the output of the comparator circuit 14 becomes ground potential, and the abnormal operation is to be detected. If the IF/B terminal of the control circuit 3 becomes ground potential, the control circuit 3 is so configured as to stop its operation.

According to the inverter circuit of the first embodiment of the present invention, it is able to detect the abnormal operation with only a single comparator circuit in spite of using a plurality of drive transformers and emitting control to a plurality of discharge tubes. In this case, it is possible to apply the first embodiment if the number of drive transformers is two or more of an even number. That is, if the number of secondary coils of balancer-transformers is j (j is an even number), the detection of the voltage by the diode 11 may be detected at a connecting-midpoint between a (j/2)th secondary coil and a ((j/2)+1)th secondary coil.

Second Embodiment

Figure 2:
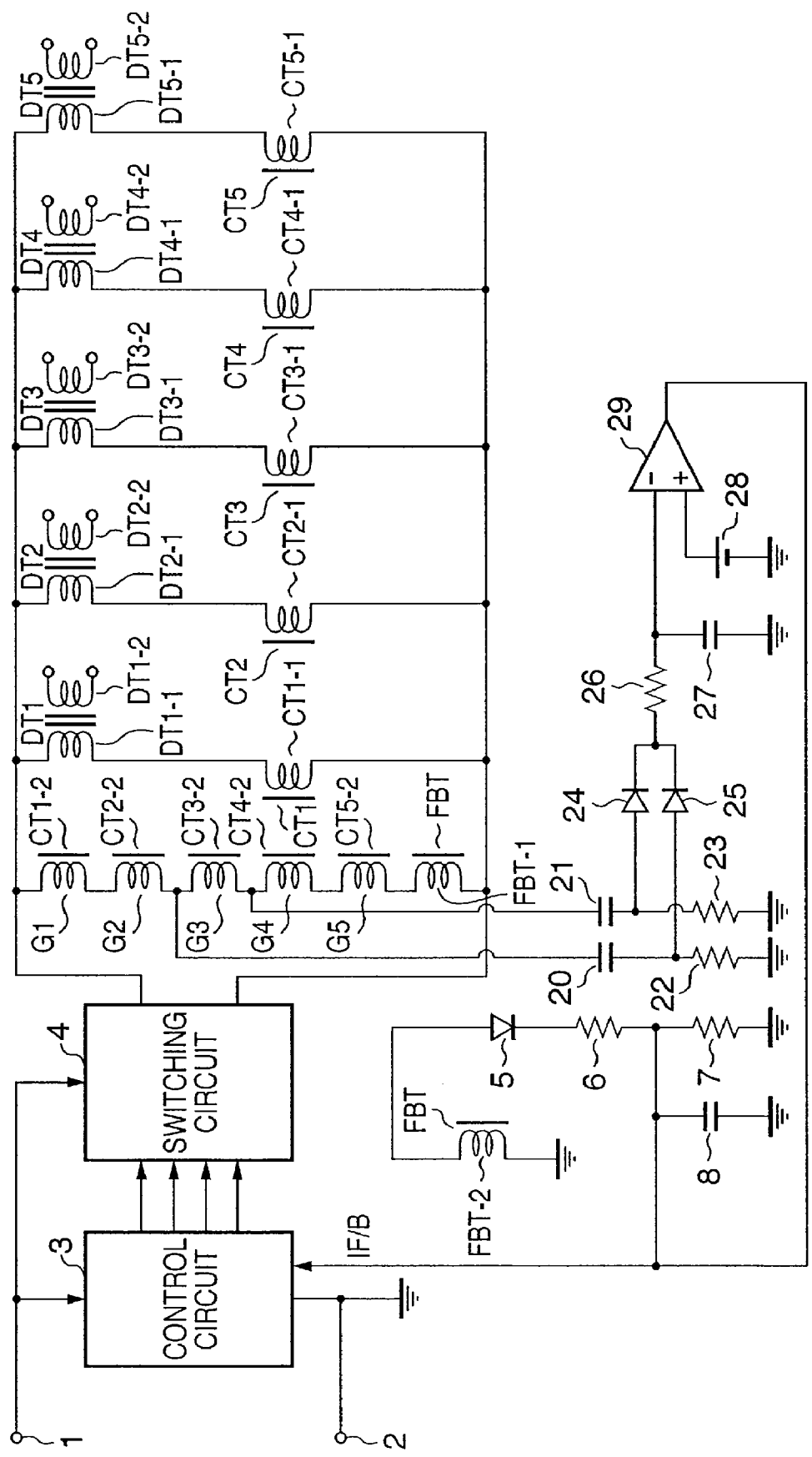
FIG. 2 is a circuit diagram of an inverter circuit employing an odd number of drive transformers according to a second embodiment of the present invention.

FIG. 2 shows a circuit diagram of an inverter circuit configured with an odd number of drive transformers according to a second embodiment of the present invention. In this case, the same reference numerals are used to the same circuit components. Like the inverter circuit in FIG. 1, a DC power source voltage Vin is applied between terminals T1 and T2. This DC power source voltage Vin is supplied to the control circuit 3 and the switching circuit 4 as DC operating voltages.

The control circuit 3 in FIG. 3 is configured as same as the control circuit 3 in FIG. 1, so that the description thereof is neglected.

The inverter circuit according to this second embodiment is configured with five drive transformers DT1 to DT5, five balancer-transformers CT1 to CT5, and one feedback transformer FBT. As shown in FIG. 2, secondary coils CT1-2 to CT5-2 of the five balancer-transformers CT1 to CT5 and a primary coil FBT-1 of the feedback transformer FBT are connected in series. Further, both ends of the series connection are connected to the pair of the output terminals of the switching circuit 4, and high frequency drive signals are applied thereto.

In addition, the primary coil DT1-1 of the drive transformer DT1 and the primary coil CT1-1 of the balancer-transformer CT1 are connected in series, and both ends of the series-connection are connected to the pair of the output terminals of the switching circuit 4.

Similarly, the primary coil DT2-1 of the drive transformer DT2 and the primary coil CT2-1 of the balancer-transformer CT2 are connected in series, and both ends of the series-connection are connected to the pair of the output terminals of the switching circuit 4.

In addition, the primary coil DT3-1 of the drive transformer DT3 and the primary coil CT3-1 of the balancer-transformer CT3 are connected in series, and both ends of the series-connection are connected to the pair of the output terminals of the switching circuit 4.

In addition, the primary coil DT4-1 of the drive transformer DT4 and the primary coil CT4-1 of the balancer-transformer CT4 are connected in series, and both ends of the series-connection are connected to the pair of the output terminals of the switching circuit 4.

In addition, the primary coil DT5-1 of the drive transformer DT5 and the primary coil CT5-1 of the balancer-transformer CT5 are connected in series, and both ends of the series-connection are connected to the pair of the output terminals of the switching circuit 4.

Further, as well-known, the high frequency drive signals are generated at the secondary coils DT1-2 to DT5-2 of the drive transformers DT1 to DT5, and drive connected discharge tubes, respectively. However, these connections are well-known, so that they are neglected in the figure.

In addition, the anode of the diode 5 is connected to one of terminals of the secondary coil FBT-2 in the feedback transformer FBT, and the cathode of the diode 5 is connected to ground by way of series-connected two resistors 6 and 7. The capacitor 8 for a rectifier operation is connected between the connecting midpoint of the two resistors 6 and 7 and the ground. Further, the other terminal of the secondary coil FBT-2 is connected to ground. By the configuration as above described, at the connecting-midpoint between the two resistors 6 and 7, a voltage that is proportional to current flowing through the series-connection circuit of the secondary coils CT1-2 to CT5-2 of the five balancer-transformers CT1 to CT5 and the primary coil FBT-1 of the feedback transformer FBT is obtained. This voltage is supplied to the IF/B terminal of the control circuit 3.

Accordingly, the control circuit 3 controls an oscillation frequency of the oscillator circuit provided inside or width of pulse signals in accordance with the voltage supplied to this IF/B terminal. Thereby, it is controlled so that a current value of the high frequency drive signals flowing through the series-connection circuit of the secondary coils CT1-2 to CT5-2 of the five balancer-transformers CT1 to CT5 and the primary coil FBT-1 of the feedback transformer FBT becomes constant. Thereby, the discharge tubes connected to the secondary coils DT1-2 to DT5-2 of the drive transformers DT1 to DT5 emit lights with a constant brightness.

In this case, a feedback circuit using this feedback transformer FBT may directly detect current flowing through any one of a plurality of discharge tubes connected to the secondary coils DT1-2 to DT5-2 of the drive transformers DT1 to DT5. On this occasion, the feedback transformer FBT is not necessary.

Further, the connecting-midpoint between a secondary coil CT2-2 of the balancer-transformer CT2 and a secondary coil CT3-2 of the balancer-transformer CT3 is connected to ground by way of a series-connection circuit of a capacitor 20 and a resistor 22. The series-connection circuit of the capacitor 20 and the resistor 22 is also connected to an anode of a diode 25.

Similarly, a connecting-midpoint between a secondary coil CT3-2 of the balancer transformer CT3 and a secondary coil CT4-2 of the balancer-transformer CT4 is connected to ground by way of a series-connection circuit of a capacitor 21 and a resistor 23. The series-connection circuit of the capacitor 21 and the resistor 23 is also connected to an anode of a diode 24.

A cathode of the diode 25 is connected to ground by way of a resistor 26 and a capacitor 27, and a connecting-midpoint between the resistor 26 and the capacitor 27 is connected to an − input terminal of a comparator circuit 29. A + input terminal of the comparator circuit 29 is supplied with a reference voltage (Vref) 28. Further, a cathode of the diode 24 is commonly connected to the cathode of the diode 25.

An output of the comparator circuit 29 is mixed with the voltage obtained at the connecting-midpoint between two resistors 6 and 7, and supplied to the IF/B terminal of the control circuit 3. In the inverter circuit shown in FIG. 2, when normally operated, the connecting-midpoint between the cathodes of the diode 24 and the diode 25 becomes a predetermined potential. However, once any of the discharge tubes breaks, expires its life, or becomes improper connection, the connecting-midpoint between the cathodes of the diode 24 and the diode 25 widely vary from the predetermined potential in the normal operation. This change is detected by the comparator circuit 29, and is supplied to the IF/B terminal of the control circuit 3.

Accordingly, once any of the connected discharge tubes breaks, expires its life, or becomes improper connection, and the voltage supplied to the − input terminal of the comparator circuit 29 increases to above the reference voltage (Vref) 28, then, the output of the comparator circuit 29 becomes ground potential, and the abnormal operation is to be detected. If the IF/B terminal of the control circuit 3 becomes ground potential, the control circuit 3 is so configured as to stop its operation.

According to the second embodiment of the present invention, it is able to detect the abnormal operation with only a single comparator circuit in spite of using an odd number of drive transformers and emitting control of odd number of discharge tubes. In this case, it is possible to apply the second embodiment if the number of drive transformers is three or more of an odd number. Namely, if the number of the secondary coils of balancer-transformers is k (k is an odd number), the detection of the voltages by the diodes 24 and 25 may be detected at two points such as at a connecting-midpoint between a ((k−1/2)th secondary coil and a ((K+1)/2)th secondary coil and at a connecting-midpoint between a ((k+1)/2)th secondary coil and a ((k+3)/2)th secondary coil.

The inverter circuits shown in FIGS. 1 and 2 are examples of the present invention, and it is possible to modify these examples without departing from a spirit of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An inverter circuit having plural sets of a drive transformer and a balancer-transformer, wherein a primary coil of the drive transformer and a primary coil of the balancer-transformer are connected in series, both ends of each of the series-connections of the plural sets are connected in parallel between output terminals of a switching circuit, and secondary coils of all the balancer-transformers of the plural sets are connected in series and connected between the output terminals of the switching circuit, the inverter circuit comprising:
   voltage detecting means for detecting a voltage at any of a connecting-midpoint of the series-connected secondary coils of the balancer-transformers; and
   voltage comparing means for comparing the voltage at any of the connecting-midpoint of the series-connected secondary coils of the balancer-transformers with a reference voltage,
   wherein the voltage comparing means outputs a signal indicating an abnormal operation when the voltage at said any of the connecting-midpoint exceeds the reference voltage.

2. The inverter circuit according to claim 1, wherein the voltage comparing means includes a comparator circuit, in which the voltage at the any of the connecting-midpoint of the series-connected secondary coils of the balancer-transformers is connected to a − input terminal of the comparator circuit, and the reference voltage is connected to a + input terminal of the comparator circuit.

3. The inverter circuit according to claim 1, wherein the voltage detecting means detects the voltage from the connecting-midpoint between the (j/2)th secondary coil and the ((j/2)+1)th secondary coil which is the series-connected secondary coil of the balancer-transformer, where j is a positive even integer.

4. The inverter circuit according to claim 1, wherein the voltage detecting means detects the voltage from the connecting-midpoint between the ((k−1)/2)th secondary coil and the ((k+1)/2)th secondary coil and from the connecting-midpoint between the ((k+1)/2)th secondary coil and ((k+3)/2)th secondary coil which is the series-connected secondary coils of the balancer-transformer, where k is a positive odd integer.

5. An inverter circuit comprising:
   a switching circuit;
   n (n is 1, 2, 3 , , , ) series-connecting circuits in each of which a primary coil of a drive transformer and a primary coil of a balancer-transformer are connected in series; and
   a secondary coil series connecting circuit in which secondary coils of n balancer-transformers used in the n series connecting circuits are connected in series,
   wherein the n series-connecting circuits and the secondary coil series connecting circuit are connected in parallel between output terminals of the switching circuit.

6. The inverter circuit according to claim 5, further comprising:
   voltage detecting means for detecting a voltage at the secondary coil series connecting circuit.

7. The inverter circuit according to claim 6, further comprising:
   comparing means for comparing the voltage detected at the secondary coil series connecting circuit with a reference voltage, wherein
      the comparing means outputs a signal indicating an abnormal operation when the voltage exceeds the reference voltage.

8. The inverter circuit according to claim 6, wherein the voltage detecting means detects the voltage from the connecting-midpoint between the (j/2)th secondary coil and the ((j/2)+1)th secondary coil which is secondary coil series connecting circuit, where j is a positive even integer.

9. The inverter circuit according to claim 6, wherein the voltage detecting means detects the voltage from the connecting-midpoint between the ((k−1)/2)th secondary coil and the ((k+1)/2)th secondary coil and from the connecting-midpoint between the ((k+1)/2)th secondary coil and ((k+3)/2)th secondary coil which is the secondary coil series connecting circuit, where k is a positive odd integer.

* * * * *

UNITED STATES PATENT AND TRADEMARK OFFICE
CERTIFICATE OF CORRECTION

PATENT NO.         : 7,515,443 B2
APPLICATION NO.    : 11/761474
DATED              : April 7, 2009
INVENTOR(S)        : Hiroyuki Miyazaki, Takeshi Hatakeyama It is certified that error appears in the above-identified patent and that said Letters Patent is hereby corrected as shown below:

On the Title Page, Item (73), under "ASSIGNEE", delete "Sumida Electric Co., Ltd., Tokyo (JP)" and insert --Sumida Corporation, Tokyo (JP)--.

Signed and Sealed this

Ninth Day of November, 2010

David J. Kappos
*Director of the United States Patent and Trademark Office*